Patented Feb. 27, 1923.

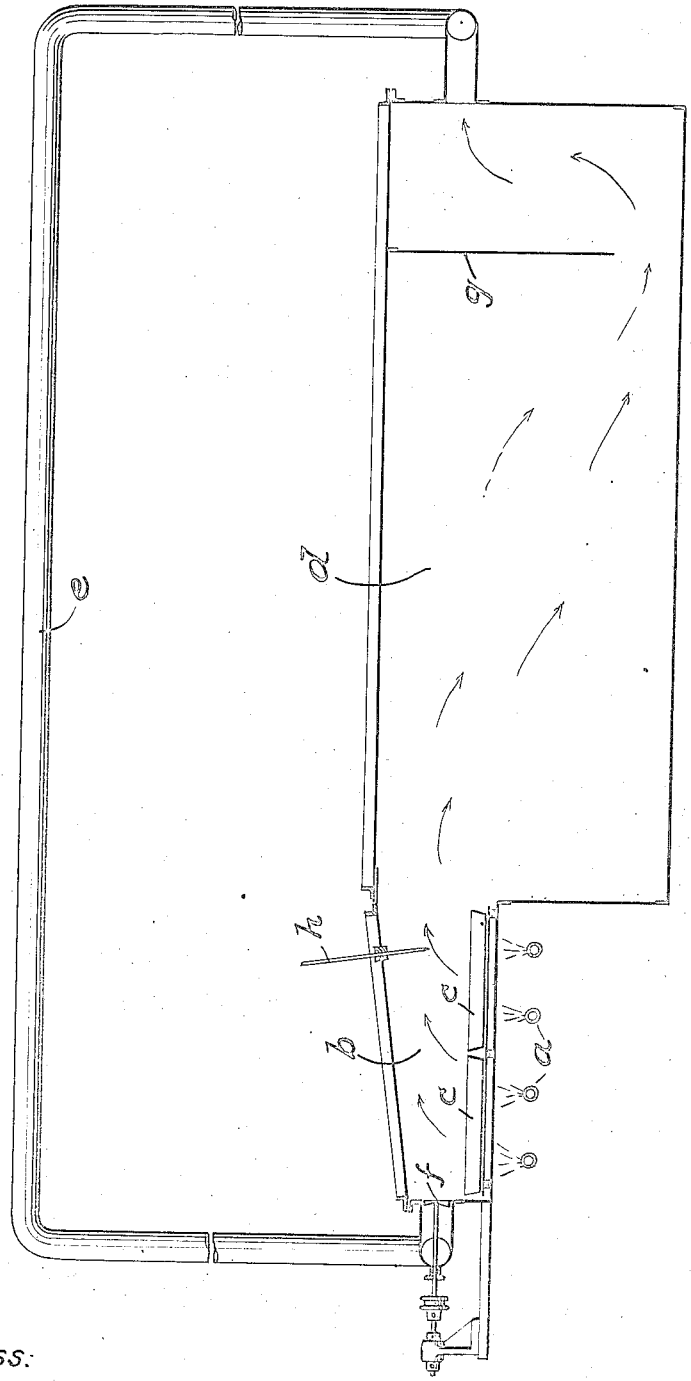

1,446,551

UNITED STATES PATENT OFFICE.

THURSTON N. DISSOSWAY, OF BROOKLYN, NEW YORK, ASSIGNOR TO DISSOSWAY CHEMICAL COMPANY, INC., OF BROOKLYN, NEW YORK, A CORPORATION OF NEW YORK.

PROCESS OF PURIFYING RESORCIN.

Application filed December 13, 1920. Serial No. 430,418.

*To all whom it may concern:*

Be it known that I, THURSTON N. DISSOSWAY, a citizen of the United States, residing at Flatbush, Brooklyn borough, county of Kings, city of New York, and State of New York, have invented a new and useful Improvement in Processes of Purifying Resorcin, of which the following is a full, clear, and exact description, reference being had to the accompanying drawings, which form a part of this specification.

In the preparation of pure resorcin from the technical or impure product, the best known and usually practiced process is to crystallize the impure product from some solvent, such as alcohol, and recrystallize, if necessary, until a product meeting the requirements is obtained. This process is not satisfactory, in that it is uneconomical; the yield not nearly approaching a quantitative one, and much of the solvent being lost.

The object of my invention is to secure a higher yield, to avoid the expense of loss of solvent, and to secure a product of at least equal purity and better keeping qualities.

The first step of my improved process contemplates a partial purification of the resorcin, involving the elimination from the resorcin of certain impurities, particularly phenol and catechol. Both these impurities are almost invariably present in the product that is sold as technical resorcin.

The impure resorcin is placed in a suitable vessel and dissolved by the aid of heat in a little water. In treating further batches of resorcin, the liquor from a previous purification will be employed. The temperature is maintained below 100° C., preferably about 90° C.

After standing for an hour or two the solution is transferred to a crystallizing vessel. It is preferred to use a stone crock that can be cooled in a water bath. The solution is stirred occasionally while the crystals are separating.

When thoroughly cold the crystals are removed in a centrifuge and dried below 100° C.

The most satisfactory purification is obtained if the process is so conducted that about 50% to 60% of the total resorcin in the hot liquor is recovered.

The mother liquor of the crystals can be used a number of times for the purification of additional batches of the impure product. The number of times that the liquor is usable depends, of course, on the comparative purity of the product started with. A run with a good quality of technical resorcin gave the following results.

The liquors were used twenty-two times and from 3500 pounds of the technical product were obtained approximately 3300 pounds of crystals suitable for sublimation. The mother liquors should have contained about 200 pounds of resorcin less certain impurities in the technical product and mechanical losses. These liquors were diluted with water until further dilution with water caused no appreciable precipitation, and the clear liquor was separated from the precipitate formed and concentrated in a still to the crystallizing point. This treatment yielded an additional seventy pounds of crystals suitable for sublimation.

In place of the above purifying process, the following procedure may be adopted. The resorcin is ground to a coarse powder, packed in a percolator, and sufficient cold benzol is added to cover the powder. After standing for a few hours the phenol and catechol dissolve in the benzol. The solution is then drawn off. The solution remaining in the resorcin is then displaced by further addition of benzol. After draining off the wash, the powder is removed from the percolator, spread on trays or pans away from flame, and dried at a temperature below 100° C. to remove the last traces of benzol.

The last described method of purification forms the subject-matter of another application filed of even date herewith, Serial No. 430,417.

The crystals obtained by the purifying treatment are then sublimed at a temperature sufficiently low to avoid decomposition of the resorcin. In carrying out this part of the process, I prefer to use the apparatus illustrated in the accompanying drawing, which is a diagrammatic longitudinal vertical sectional view.

Over the burners $a$ is a heating chamber $b$, in which are placed pans $c$ containing the partially purified resorcin crystals. Beyond the heating chamber $b$ and in free communication therewith is a much larger condensing chamber $d$. A pipe $e$ connects the rear end of the condensing chamber with the front end of the heating chamber. A fan $f$ establishes or facilitates a proper circulation of the vapor. Within the condensing chamber, near its exit, is a baffle plate $g$.

It is somewhat difficult to accurately determine the temperature to which the resorcin is raised If a thermometer bulb is inserted in the material, the vaporization of the latter frees the bulb wholly or partially from contact therewith, and the temperature is then largely a matter of guess work. It is found, however, that if the thermometer ($h$) be suspended in the heating chamber, above the material, and preferably near the exit of the heating chamber, the temperature of the vapor, and incidentally of the material, may be maintained substantially constant. It is found that if the vapor at this point be maintained between 115–135° C., sublimation may be efficiently carried on. Below the minimum of this range, the process is too slow to be economical. Above the maximum of this range, discoloration is produced, especially toward the end of the process It is distinctly preferred to maintain the temperature between 125 and 130° C., this producing a high yield of superior quality and with sufficient rapidity to satisfy the requirements of economy.

During the process the resorcin vapor driven off largely condenses in the chamber $d$. Uncondensed vapor returns through pipe $e$ to the heating chamber $b$.

The operation may continue for the larger part of twenty-four hours. Assuming that twenty-eight pounds of resorcin crystals are placed in the pans, from fourteen to twenty pounds of resorcin will have been sublimed at the end of this period.

To the residue in the pans (consisting mainly of resorcin) are then added fresh resorcin crystals in an amount (say) about equal to the quantity sublimed, and the operation is repeated. The operation may be repeated a number of times until the residue remaining in the pans consists largely of impurities; such impurities, however, containing a substantial proportion of resorcin, which it is desirable to recover.

This resorcin is recovered by washing the pans with water, separating the solution of resorcin from insoluble matter, and recovering the resorcin either by extraction of the solution with an immiscible solvent, such as ether, or by concentration of the solution, preferably in a still, and crystallization of the resorcin from the concentrated liquor.

From the above description it will be observed that I obtain from 3500 pounds of resorcin approximately 3400 pounds of resorcin suitable for sublimation. Allowing for the loss, in the shape of impurities left in the subliming pans, and crediting the recovery of resorcin from these impurities, I have found that, in the practice of the process on a commercial scale, approximately ninety-five per cent of the resorcin contained in the impure product put in work has been obtained as U. S. P. Resorcin.

The partial purification of the resorcin prior to sublimation is necessary only when the resorcin contains impurities, such as phenol and catechol, which would be carried over, in the sublimation process, with the vapors of resorcin into the condensing chamber and contaminate the sublimed product. Inasmuch as the technical resorcins on the market almost invariably contain such impurities, a previous purification is generally necessary.

Having now fully described my invention, what I claim and desire to protect by Letters Patent is:

1. The process of purifying resorcin which comprises sublimation of the resorcin and regulating the temperature by maintaining the vapors near the exit of the heating chamber above about 115 degrees C., thereby insuring vaporization of a substantial part of the resorcin, and below about 135 degrees C., thereby avoiding decomposition.

2. The process of purifying resorcin which comprises sublimation of the resorcin while maintaining the temperature of the vapors near the exit of the heating chamber at between 125 and 130 degrees C., thereby insuring the vaporization of the maximum percentage of resorcin consistent with insurance against decomposition.

In testimony of which invention, I have hereunto set my hand, at Brooklyn, N. Y., on this tenth day of December, 1920.

THURSTON N. DISSOSWAY.